United States Patent [19]

Kawai et al.

[11] Patent Number: 4,696,079
[45] Date of Patent: Sep. 29, 1987

[54] APPARATUS FOR AUTOMATICALLY STUFFING MEAT IN A CASING

[75] Inventors: Keiichi Kawai; Setsuo Yasuda; Zenichiro Sakaime, all of Osaka, Japan

[73] Assignee: Futabadenki Kogyo Kabushiki Kaisha, Osaka, Japan

[21] Appl. No.: 857,199

[22] Filed: Apr. 29, 1986

[30] Foreign Application Priority Data

May 8, 1985 [JP] Japan .................................. 60-97334

[51] Int. Cl.$^4$ ........................................... A22C 11/02
[52] U.S. Cl. ........................................... 17/33; 17/49
[58] Field of Search .................. 17/33, 39, 49, 38, 34; 141/313

[56] References Cited

U.S. PATENT DOCUMENTS 3,919,739 11/1975 Kawai ................................. 17/38 X
4,129,923 12/1978 Hoegger ............................. 17/34 X
4,587,689 5/1986 Nakamura ......................... 17/33 X Primary Examiner—Willie G. Abercrombie
Attorney, Agent, or Firm—Antonelli, Terry & Wands

[57] ABSTRACT

An apparatus for automatically stuffing meat in a casing, the apparatus comprising a meat extruder including a filling nozzle; an arrangement for supplying a continuous band of casing; an a carrier for carrying the casing from the supplying arrangement to the filling nozzle, wherein the carrier includes a stop unit whereby the casing is secured to the carrier so as to effect the unitary movement thereof. A casing holder holds the open end of the casing and assists the casing to ride on the open end of the filling nozzle. A first cutting-and-fastening device is located at the casing supply side, and a second cutting-and-fastening device is located at the casing outlet side, with the second cutting-and-fastening device being adjustable with respect to the first cutting-and-fastening device.

1 Claim, 4 Drawing Figures

APPARATUS FOR AUTOMATICALLY STUFFING MEAT IN A CASING

BACKGROUND OF THE INVENTION

1. Field of the Invention

The present invention relates to apparatus for automatically stuffing meat in casings into sausages.

2. Description of the Prior Art

In, for example, Japanese Patent No. 819,273 and U.S. Pat. No. 3,917,739, an apparatus for automatically stuffing meat into casings as proposed wherein a casing in the form of a continuous band is carried by a carrier guided along an elongated frame extending from a point adjacent to the filling nozzle of a meat extruder. The casing is held on the filling nozzle while the carrier is returned to its starting position, during which meat is extruded into the casing. When the predetermined quantity of meat has been extruded, the continuous casing is cut away from the subsequent portion, and both open ends of the casing are automatically fastened into a cased meat, such as sausage, by first and second cutting-and-faastening devices.

A disadvantage of the proposed apparatus resides in the fact that the positions of the first and second cutting-and-fastening devices are not adjustable with respect to each other, so that a particular apparatus is only applicable to a particular length of meat. This limits the applicablity of the apparatus. In the light of the price of the apparatus the limited applicability is not economical.

The present invention aims at avoiding the above-noted disadvantage and has for its object the provision of an improved automatic apparatus for producing stuffed meat, with the apparatus having a cutting-and-fastening device adjustable with respect to one another, so that the distance between the two cutting-and-fastening devices can be adjusted as desired.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description and drawings.

In accordance with advantageous features of the present invention, an apparatus is provided for automatically stuffing meat in a casing, with the apparatus including a meat extruder having a filling nozzle as well as means for supplying a continuous band of casing, and a carrier for carrying the casing from the supply means to the filling nozzle, wherein the carrier includes a stock unit whereby the casing is secured to the carrier so as to effect a unitary movement thereof. A casing holder is provided for holding the open end of the casing so as to assist the casing to ride on the open end of the filling nozzle. A first cutting and fastening means is located at the casing supply side, and a second cutting and fastening means is located at the casing outlet side, with the second cutting and fastening means being adjustable with respect to the first device.

DETAILED DESCRIPTION OF THE INVENTION

Figure 1:
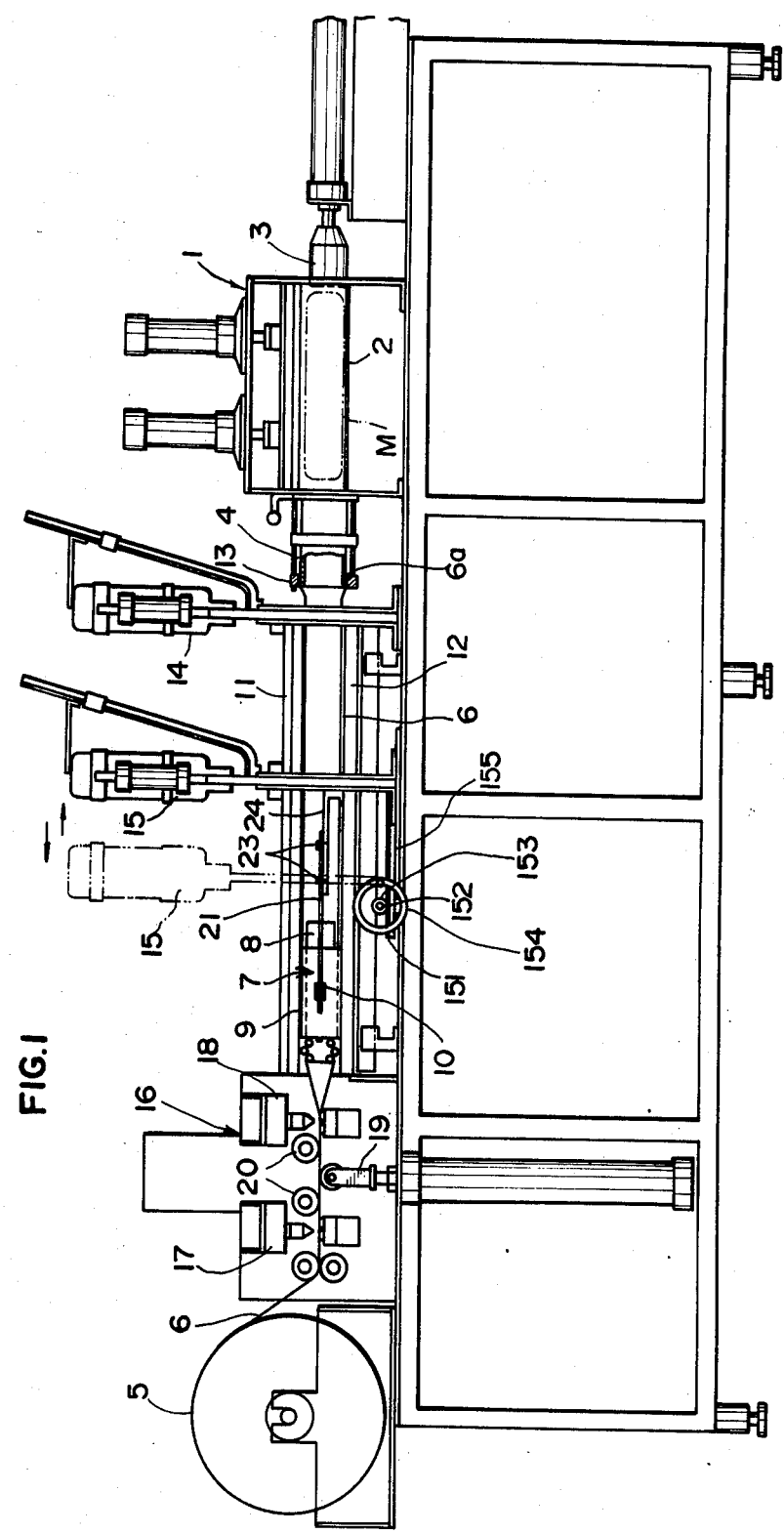
FIG. 1 is a front view showing an apparatus for automatically stuffing meat in casings constructed in accordance with the present invention.
Figure 2:
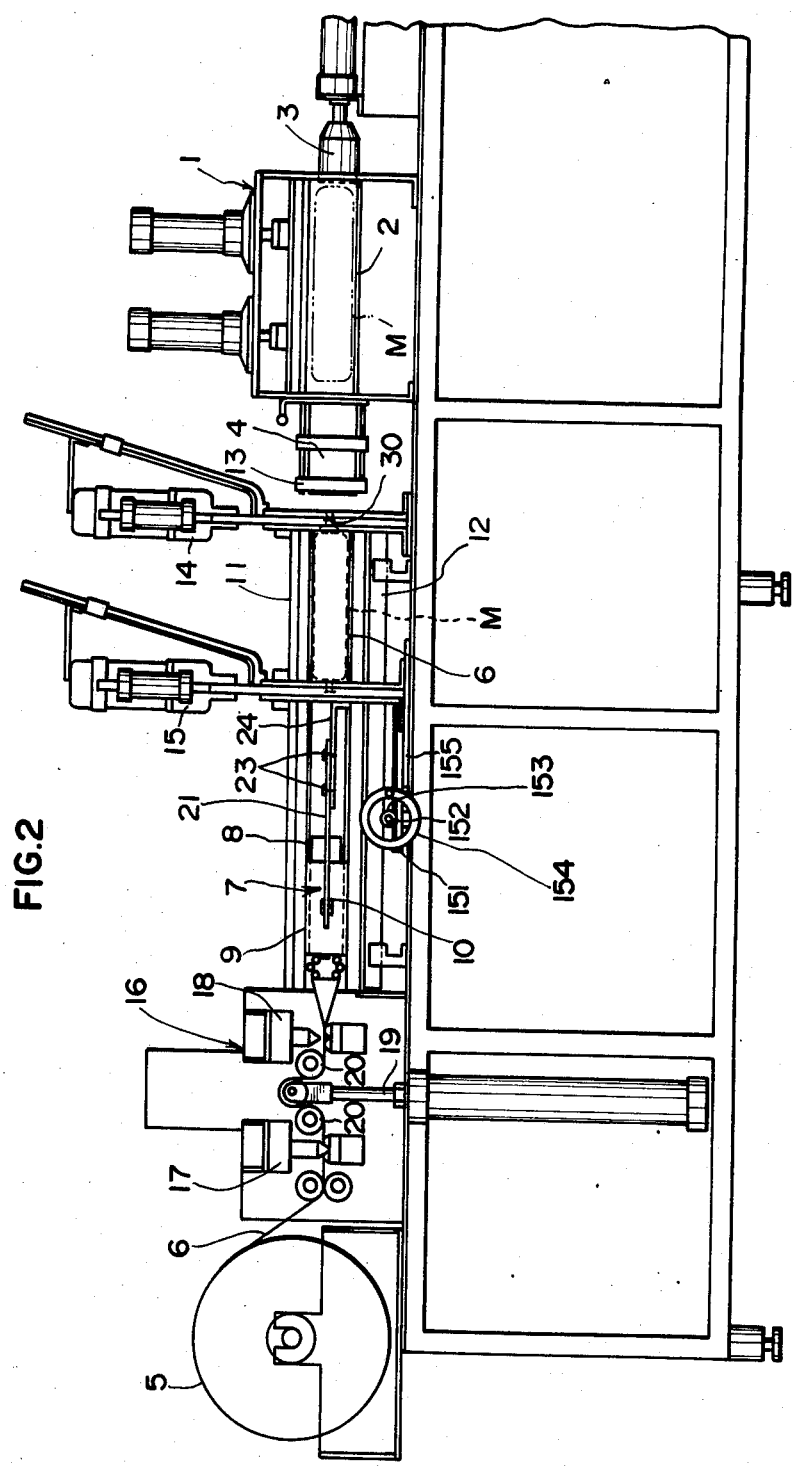
FIG. 2 is a front view showing the apparatus of FIG. 1 in operation.

Referring now to the drawings wherein like reference numerals are used throughout the various views to designate like parts and, more particularly, to FIGS. 1 and 2, according to these figures, an apparatus for automatically stuffing meat in casings comprises a meat extruder generally designated by the reference numeral 1 which includes a filling nozzle 4, having a casing holder 13 disposed around a periphery thereof, and a pusher 3 for extruding meat N stored in a hopper. A continuous band of casing is wound around a reel 5, and a reciprocably movable carrier is provided for movement along guide rails 11, 12 extending axially of the filling nozzle 4, with the carrier starting from a point near the filling nozzle 4.

Figure 3:
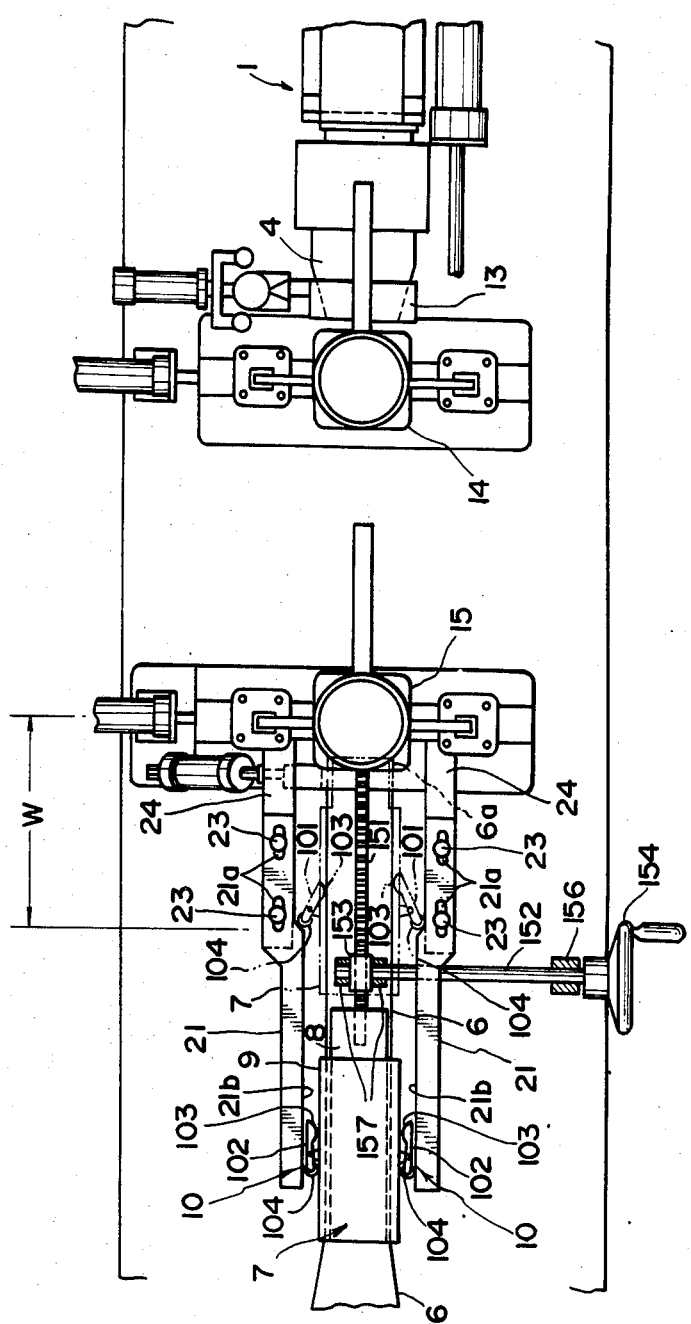
FIG. 3 is a plan view on a larger scale showing a main section of the apparatus.
Figure 4:
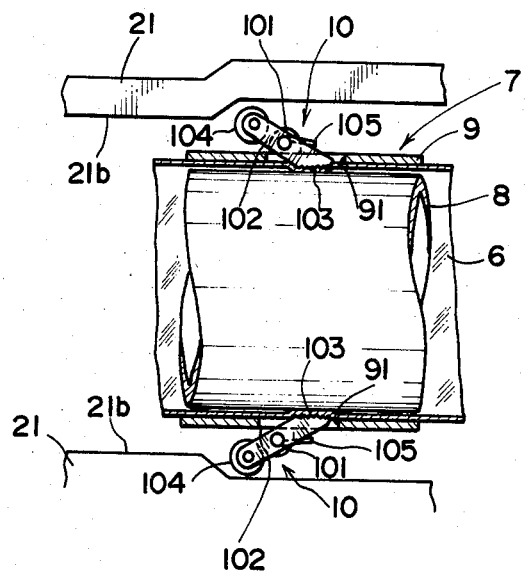
FIG. 4 is a cross-sectional view on a larger scale showing an operational relationship between the carrier and the stop units.

The carrier 7 includes an inner cylinder 8 and an outer cylinder 9 (FIG. 4). There are provided a pair of stop units 10, each of which includes a bracket 101 fixed to the outer cylinder 9, an arm 102 pivotally supported on the bracket 101, the arm including teeth 103 produced in its top end, a roller 104 provided at the opposite end of the arm to the teeth 103, and a spring 105 biasing the arm 102 so that the teeth 103 are toward the inner cylinder 8 through an aperture 91 produced in the outer cylinder 9, thereby enabling the teeth 103 to come into contact with the casing 6 on the inner cylinder 8 as shown in FIG. 4. In FIG. 4, when the teeth 103 are placed in contact with the casing 6 as shown in FIG. 4 (hereinafter referred to as the locking position), the carrier 7 can move only to the left. If the carrier 7 is caused to move to the right, the teeth 103 bites the casing 6, and secures it on the outside of the carrier 7. When the teeth 103 comes out of contact with the casing (FIG. 3), hereinafter referred to the unlocking position, the casing 6 is released from the carrier 7. When the arm 102 is at the locking position, and the carrier 7 is caused to move to the right, the casing 6 is pulled out from the reel 5.

Cutting-and-fastening devices 14 and 15 cut the casing 6 having meat stuffed therein, and fasten both ends of the casing 6. The device 14 is fixed to the machine body, adjacent to the filling nozzle 4, and another device 15 is movably provided midway along the guide rails 11 and 12. The device 15 includes a stationary rack 151, and a pinion 153 engageable therewith, with the pinion 153 being fixed to a rotating shaft 152 carried on bearings 156, 157. The shaft 152 is turned by a handle 154, which is rotatable in either direction. The device 15 is moved on the guide key 155 to the left or right in accordance with the rotating direction of the handle 154. In this way the device 15 is reciprocally movable over a predetermined distance.

A stretching-and-supplying device 16 is provided for putting the stuffed casing into shape. The stretching-and-supplying device 16 includes a pair of chucks 17, 18, one being located at the casing supply side, and the other being located at the casing outlet side, a rod 19 provided therebetween in such a manner as to project and withdraw with respect to the casing 6, and guide rollers 20 located at opposite sides of the rod 19.

As clearly shown in FIG. 3, a cam plate 21 includes an end portion having longitudinally extending holes 21a through which bolts 23 are anchored to join a fixture plate 24 integral with the device 15. The cam plates 21 are provided on either side outside the path of the carrier 7.

In operation, the casing 6 is carried to the filling nozzle 4 by the carrier 7, and its open end 6a is caused to ride on the open end of the nozzle 4, where the casing 6 is held by the casing holder 13.

The meat is stored in the hopper 2, and extruded into the casing 6 through the filling nozzle 4 by the pusher 3 until the casing 6 is stuffed with a predetermined amount of meat. The carrier 7 is returned to its starting position shown in FIG. 2.

After the casing 6 is stuffed with the meat, the casing 6 is released from the holder 13, and the first cutting-and-fastening device 14 is actuated to fasten the open end 6a of the casing 6 with a ring 30. When the chuck 17 of the stretching-and-supplying device 16 holds the stuffed casing, and the rod 19 is raised, thereby stretching the casing 6 toward the casing supply side. Since the casing is pulled back, its wall is placed in tight contact with the meat, thereby expelling an extrapped air present between the casing wall and the meat.

During the operation of the second cutting-and-fastening device 15 another chuck 18 holds the stuffed casing 6, whereas, the chuck 17 is freed from the casing. At this stage the rod 19 is further raised, thereby pulling a fresh casing 6 for the next stuffing operation. When a predetermined length of the casing 6 is pulled out, the casing 6 is released from the second chuck 18, ahd the rod 19 lowers to its original position. At this moment the carrier 7 is at the waiting position indicated in solid lines in FIG. 3. When the casing 6 starts to advance, the stop units 10 are kept at the unlocking positions until the top end of the carrier 7 moves to a point near the open end 6a of the casing 6. When the carrier 7 is at the position indicated in phantom lines in FIG. 3, the stop units 10 are displaced to the locking position by means of the cam plates 21, thereby securing the casing to the carrier 7. In this way the casing is pulled from the reel 5, and the carrier 7 advances to a point near the filling nozzle 4, where its open end 6a is caused to ride on the nozzle 4. Then the carrier 7 is withdrawn to take the position shown in FIG. 1. The same procedure will be repeated.

In the above-mentioned stuffing operation the lengths of the casing are adjusted as desired in the following manner:

The handle 154 is turned so as to move the second cutting-and-fastening device 15 toward the first device 14. In this way the distance therebetween is shortened.

When the carrier 7 starts from the position shown in FIGS. 1 and 3, the teeth 103 of the stop units 10 are made free from the casing in the initial course of movement of the carrier. This is effected by the rollers 104 being oppressed by the cam face 21B. However, when the rollers 104 come out of contact with the cam face 21b as seen in FIG. 4, the arms 102 are biased toward the carrier 7 until the teeth 103 are engaged with the casing 6, thereby securing the casing to the carrier 7. When the carrier 7 moves, the casing is pulled in the same direction. Since the cam plate 21 is fixed to the second device 15, the distance (W) between the second device 15 and the termiating end of the cam plate 21b is constant regardless of the positions of the second device 15. This ensures that the length of the casing portion which protrudes from the point at which the casing 6 is held by the stop units 10 is constant, which means that the casing portion of the constant same length rides on the filling nozzle 4. This avoids the waste of the casing 6. The cam plate 21 can be adjusted in position with respect to the second cutting-and-fastening device 15 by loosening the bolts 23, thereby changing the distance (W) between the second device 15 and the termiating end of the cam face 21b, and controlling the timing for placing the stop units 10 into the locking position.

As evident from the foregoing description, the second cutting-and-fastening device 15 can be moved with respect to the stationary first device 14, thereby producing various lengths of stuffed casings in accordance with those of meat. The length of the casing portion which rides on the filling nozzle 4 is constant, thereby avoiding the waste of casing 6 regardless of the fact that the second cutting-and-fastening device 15 is adjustable. This leads to the economy of the production. When the stretching-and-supplying device 16 is used in combination with the apparatus, the stuffing operation can be performed in a relatively short period of time.

What is claimed is:

1. An apparatus for automatically stuffing meat in a casing, the apparatus comprising:

a meat extruder including a filling nozzle;

means for supplying a continuous band of casing;

a carrier means for carrying the casing from the supplying means to the filling nozzle, wherein the carrier means includes a stop means whereby the casing is secured to the carrier means so as to effect the unitary movement thereof;

a casing holder means for holding the open end of the casing so as to assist the casing to ride on an open end of the filling nozzle;

a first cutting-and-fastening means located at a casing supply side; and a second cutting-and-fastening means located at a casing outlet side, wherein the second device is adjustable with respect to the first device, the second cutting-and-fastening device including a cam plate having a cam face whereby the stop means is caused to assume a locking position and an unlocking position with respect to the casing against the carrier means.

* * * * *